(12) United States Patent
Kim et al.

(10) Patent No.: US 7,751,478 B2
(45) Date of Patent: Jul. 6, 2010

(54) PREDICTION INTRA-MODE SELECTION IN AN ENCODER

(75) Inventors: Changick Kim, Cupertino, CA (US);
William Chen, Foster City, CA (US);
Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 1568 days.

(21) Appl. No.: 11/041,141

(22) Filed: Jan. 21, 2005

(65) Prior Publication Data

US 2006/0165170 A1 Jul. 27, 2006

(51) Int. Cl.
*H04N 7/18* (2006.01)
(52) U.S. Cl. .............................. 375/240.12; 375/240.13
(58) Field of Classification Search ................................. 375/240.01–240.29
See application file for complete search history.

(56) References Cited

U.S. PATENT DOCUMENTS

| | | | |
|---|---|---|---|
| 6,526,096 B2 | 2/2003 | Lainema et al. | |
| 6,646,578 B1 | 11/2003 | Au | |
| 6,674,911 B1 | 1/2004 | Pearlman et al. | |
| 6,711,212 B1 | 3/2004 | Lin | |
| 6,728,315 B2 | 4/2004 | Haskell et al. | |
| 6,757,330 B1 | 6/2004 | Hsu | |
| 6,763,068 B2 | 7/2004 | Oktem | |
| 6,785,333 B2 | 8/2004 | Yoo | |
| 6,795,584 B2 | 9/2004 | Karczewicz et al. | |
| 6,798,977 B2 | 9/2004 | Maeda | |
| 7,450,640 B2 * | 11/2008 | Kim et al. | 375/240.12 |
| 2003/0058949 A1 | 3/2003 | MacInnis et al. | |
| 2003/0112873 A1 | 6/2003 | Demos | |
| 2003/0202607 A1 | 10/2003 | Srinivasan | |
| 2004/0001546 A1 | 1/2004 | Tourapis et al. | |
| 2004/0013199 A1 | 1/2004 | Winger et al. | |
| 2004/0131121 A1 | 7/2004 | Dumitras et al. | |
| 2004/0170333 A1 | 9/2004 | Toivonen et al. | |
| 2004/0170395 A1 | 9/2004 | Filippini et al. | |
| 2004/0190616 A1 | 9/2004 | Linzer et al. | |
| 2004/0233993 A1 | 11/2004 | Johansen et al. | |
| 2004/0240549 A1 | 12/2004 | Cote et al. | |
| 2004/0252768 A1 | 12/2004 | Suzuki et al. | |

(Continued)

FOREIGN PATENT DOCUMENTS

WO WO 02/071741 9/2002

(Continued)

OTHER PUBLICATIONS

"Sobol Partial Distortion Algorithm for Fast Full Search in Block Motion Estimation", D. Quaglia, et al., Proceedings of EuroGraphics Multimedia Workshop 2001, Manchester, United Kingdom, Sep. 2001, pp. 87-94.

(Continued)

*Primary Examiner*—Andy S Rao

(57) ABSTRACT

A prediction mode for encoding data is selected using a reduced number of rate-distortion cost computations. This reduction in rate-distortion cost computations is caused by filtering the number of potential intra prediction modes based on two criteria. First, the number of potential prediction modes is reduced based on at least one characteristic of a quantization procedure performed during the encoding procedure. Second, the number of potential prediction modes is reduced based on an error value calculated for each of the potential prediction modes.

22 Claims, 9 Drawing Sheets

U.S. PATENT DOCUMENTS

2005/0276493 A1* 12/2005 Xin et al. ............... 382/239

FOREIGN PATENT DOCUMENTS

WO    WO 2004/080084    9/2004

OTHER PUBLICATIONS

Chen, et al., "Efficient Block Size Selection for MPEG-2 to H.264 Transcoding", pp. 300-303, 2004.

Sullivan, G., et al., "Video Compression—From Concepts to the H.264/AVC Standard", Proceedings of the *IEEE*, vol. 93, No. 1, Dec. 2004, pp. 18-31.

He, Zhihai, et al., "A Unified Rate-Distortion Analysis Framework for Transform Coding", *IEEE* Transactions on Circuits and Systems for Video Technology, vol. 11, No. 12, Dec. 2001, pp. 1221-1236.

Hyungjoon Kim, et al., "Low-Complexity Macroblock Mode Selection for H.264/AVC Encoders", *IEEE* International Conference on Image Processing, Oct. 2004.

"Efficient Intra-Prediction Algorithm in H.264", B. Meng, et al., 2003, pp. 837-840.

"H.264 and MPEG-4, Video Compression, Video Coding for Next-generation Multimedia", Iain E.G. Richardson, 2003, pp. 170-185.

* cited by examiner

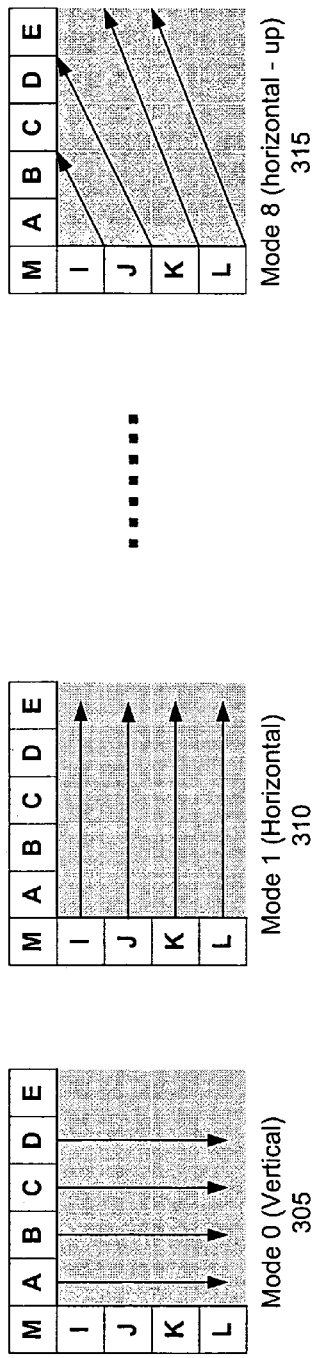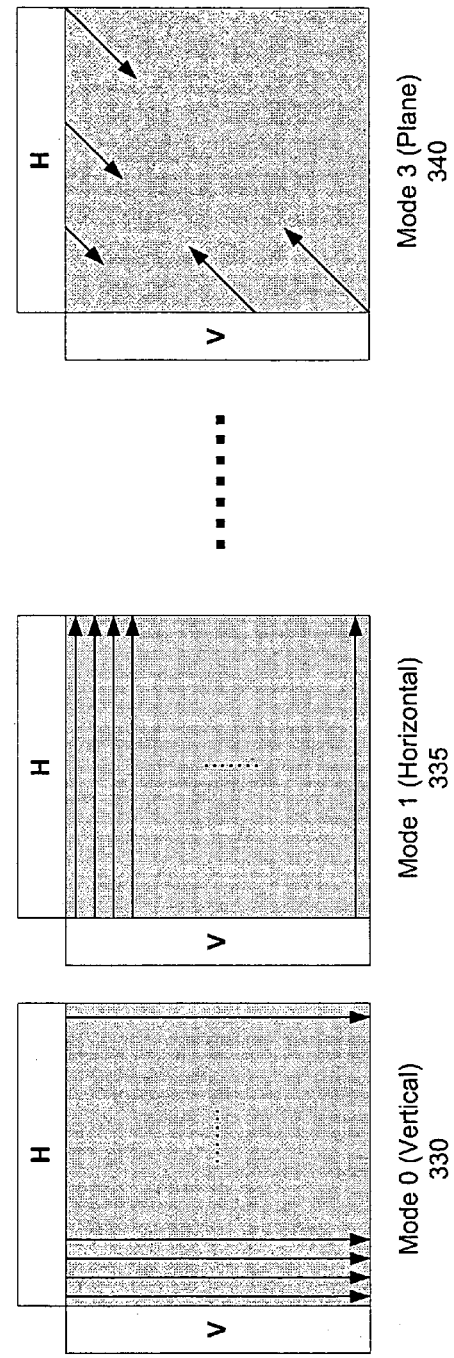
Figure 3A (4x4 Luma Block)
Figure 3B (16x16 Luma Block, 8x8 Chroma Block)

Exemplary K Table

| QP Range | I-Slice | P or B-Slice |
|---|---|---|
| QP < 21 | K = 3 | K = 0 |
| 21 ≤ QP < 33 | K = 5 | K = 1 |
| 33 ≤ QP | K = 7 | K = 3 |

4 x 4 Luma Block Prediction 16 x 16 Luma Block or
8 x 8 Chroma Block
Prediction

PREDICTION INTRA-MODE SELECTION IN AN ENCODER

BACKGROUND

A. Technical Field

The present invention relates generally to the encoding of data for transmission along a communications link, and more particularly, to the selection of modes in which data is encoded prior to transmission.

B. Background of the Invention

The burden of high bandwidth applications, such as voice and video, on networks is continually increasing. To facilitate these bandwidth hungry applications, compression technology and standards are evolving to allow these applications to be more effectively communicated across a network to a client. Two such standards are H.264 and MPEG-4 which relate to the encoding of video signals. Although these standards generally improve the method in which data is encoded, they may also place a significant strain on processing resources on the encoder itself. Because of the time-sensitive nature of transmitting and receiving video data, an encoder has a limited amount of time to select an appropriate encoding method for a video frame, encode the video frame, and transmit the frame onto a network. The quality of the video signal may be jeopardized if the encoder is unable to complete all of the necessary encoding computations, within the requisite time, that are required to encode and transmit the video signal.

FIG. 1 illustrates a typical communications link 120 on which an encoded video signal may be communicated. As illustrated, a video camera 110 generates a video signal which is sent to an encoder 115. This encoder 115 may be software located on a computer or server that is connected to the communications link 120. The encoder 115 receives a video frame which may be divided in macroblocks. These macroblocks may be further divided into luma components (e.g., 4×4 blocks and 16×16 blocks) and chroma components (e.g., 8×8 blocks). These blocks may be encoded in either an inter or intra mode that is selected by the encoder 115. Intra mode encoding means that encoding occurs relative to data within the same video frame. Inter mode encoding means that encoding occurs relative to one or more reference frames outside the current video frame. After the blocks are encoded they are transmitted, via the communications link 120, to a receive-side decoder 125. The decoder 125 reconstructs the video signal and provides it to the display device 130.

FIG. 2 illustrates a typical method in which a video signal may be encoded. A video frame 205 is transformed 210 using a discrete cosine transformation ('DCT') into a set of spatial frequency coefficients 212; this DCT is analogous to a transformation from a time domain signal into a frequency domain signal. The frequency coefficients are then quantized 215 resulting in a scaled signal 220. In effect, the quantization process divides the frequency coefficients by an integer scaling factor and thereafter truncating the signal. This process of transforming and quantizing the frame 205 introduces error, such as lost data, into the video signal.

The amount of error introduced into the video signal by the encoding processing may be determined by reconstructing the encoded frame. Reconstruction occurs by reverse quantizing 225 the video signal, which results in a rescaled signal 230. This rescaled signal 230 is then inversely transformed 235 by an inverse discrete cosine transform to produce a reconstructed frame 245. This reconstructed frame 245 may be compared to the original video frame 205 to identify the error introduced by the encoding process. The video frame 205 may be encoded in one of multiple different prediction modes, each mode typically having a different error level than the other modes.

Each macroblock may be coded in one of several coding modes depending on the slice-coding type: seven different block modes for motion-compensation in the inter-mode, and various spatial directional prediction modes in the intra-modes. In all slice-ceding types, two classes of intra coding modes are supported, which are denoted as Intra4×4 and Intra16×16 in the following. When using the Intra4×4 mode, each 4×4 block of the luminance component utilizes one of nine prediction modes. When using the Intra16×16 mode, four prediction modes are supported. The chrominance samples of a macroblock are always predicted using a unique DC prediction regardless of what intra-coding mode is used for luminance and intra prediction across slice boundaries is not allowed.

FIG. 3A shows three exemplary prediction mode diagrams for a 4×4 luma video block according to the H.264 standard. These standards define a total of nine different prediction modes, mode 0 through mode 8, in which a 4×4 luma block may be encoded. Mode 0 305 is a vertical mode in which pixel data is extrapolated from upper samples within the block. Mode 1 310 is a horizontal mode in which pixel data is extrapolated from left samples within the block. Mode 8 315 is a horizontal-up mode in which pixel data is extrapolated from left and lower samples within the block. Modes 2 through 7 are not shown, but detailed description of all 4×4 luma block modes are available in the H.264 standard.

FIG. 3B shows three exemplary mode diagrams for a 16×16 luma video block or 8×8 chroma video block according to the H.264 standard. This standard defines a total of four different prediction modes, mode 0 through mode 3, in which either a 16×16 luma or 8×8 chroma block may be encoded. Mode 0 330 is a vertical mode in which pixel data is extrapolated from upper samples within the block. Mode 1 335 is a horizontal mode in which pixel data is extrapolated from left samples within the block. Mode 3 340 is a "plane" mode in which a linear plane function is fitted to the upper and left-hand samples within the block. Mode 2 is not shown, but detailed descriptions of all 16×16 luma and 8×8 chroma block modes are available in the H.264 standard.

The selection of a prediction mode for a particular block may require significant processing resources because of the time-sensitive characteristics of a video signal. In particular, an encoder has a limited amount of time to select a prediction mode, encode a block according to the prediction mode, and transmit the block onto a network. If the selection of a prediction mode requires a large number of processor computations, this may create processing difficulties on the encoder to timely encode and transmit the video signal.

The selection of a prediction mode may include rate-distortion computations for each of the potential prediction modes. An analysis of each mode's rate-distortion value allows for the selection of an optimal prediction mode for a particular block. However, these rate-distortion computations may be processor intensive and place a burden on the encoder to timely encode the video signal. The rate-distortion value is defines as:

$$J(s,c,m|QP,\lambda_m) = SSD(s,c,m|QP) + \lambda_m * R(s,c,m|QP),$$

where QP is the macroblock quantization parameter, $\lambda_m$ is the Lagrange multiplier for mode decisions, SSD is the sum of the squared differences between the original block and a reconstructed block, and R represents the number of bits associated with the mode.

The complexity of the rate-distortion computation, and the number of times the computation is performed, directly affects the time and resources required to identify a prediction mode for a block. Depending on the encoder, and the system in which the encoder operates, these computations may overload the encoder resulting in a degradation of the encoded video signal that it generates.

Accordingly it is desirable to provide a device and method that addresses the above-described problems.

SUMMARY OF THE INVENTION

The problems and disadvantages heretofore associated with the prior art are overcome by the present invention.

According to one embodiment of the present invention, a plurality of prediction modes are identified that may be used to encode a particular block of data. An error value is calculated for each of the prediction modes within the plurality of prediction modes. The plurality of prediction modes is reduced to a smaller set of potential prediction modes based on the error values calculated for the modes and a quantization parameter used during the encoding process. The smaller set of potential prediction modes is analyzed to determine a prediction mode that will be used to encode the particular data block. After a prediction mode is selected, the data is encoded according to the particular prediction mode and transmitted onto a communications link.

This initial reduction of prediction modes to a smaller set of potential prediction modes may significantly reduce the processing resources and time required to select a prediction mode for a particular block of data.

In yet another embodiment, prediction modes are selected for luma and chroma components of a video macroblock, which are defined in the H.264 standard. A prediction mode is selected for a 4×4 luma block by initially reducing the standard-defined nine prediction modes to a smaller subset of prediction modes. This reduction is based on a calculated error value for each of the nine prediction modes and a quantization parameter to be employed during the encoding of the data block. After the smaller subset of prediction modes is identified, each mode in this smaller subset is analyzed to select a single prediction mode. One method in which this analysis may occur is through computing a rate-distortion cost for the reduced number of prediction modes. The prediction mode, within the smaller subset, having the most optimal rate-distortion cost is selected and the 4×4 luma block is encoded accordingly.

Prediction modes for an 8×8 chroma and 16×16 luma block may be identified by calculating an error value for each of four modes available to encode these blocks as defined by the H.264 and MPEG-4 standards. According to one embodiment of the invention, this error calculation uses a sum of absolute difference computation to estimate the amount of data lost during the encoding of a block in a particular prediction mode. Thereafter, an appropriate prediction mode for this block may be selected by identifying the mode that introduces the least amount of data lost during the encoding process. Thereafter, the particular 8×8 chroma or 16×16 luma block is encoded according to the selected prediction mode.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3A is an illustration of representative prediction modes for a 4×4 luma block of data.

FIG. 3B is an illustration of representative prediction modes for a 16×16 luma block or an 8×8 chroma block of data.

FIG. 6 is an exemplary K table according to one embodiment of the present invention.

DETAILED DESCRIPTION OF THE PREFERRED EMBODIMENTS

An apparatus and method for selecting a mode for encoding a video signal, including luma and chroma components therein, is described. In one embodiment of the present invention, the number of available prediction modes is filtered, prior to calculating rate-distortion values, relative to a quantization parameter applied during encoding. This filtering process reduces the number of modes for which a rate-distortion value needs to be calculated; thereby reducing the resources and time required to encode the video signal.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including personal computers and network servers. The embodiments of the present invention may also be present in software, hardware or firmware. Structures and devices shown below in block diagram are illustrative of exemplary embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

The present invention selects prediction modes that are used to encode a video signal macroblock. This macroblock may be partitioned into luminance blocks ("luma blocks") that relate to the intensity of a video image and chroma blocks that relate to the color of a video image. These luma and chroma blocks may be partitioned from a macroblock using a number of different methods. One such method, as defined by the H.264 standard, partitions the luma component into 4×4 blocks and 16×16 blocks. Additionally, as defined in the H.264 standard, the chroma component of a macroblock may be separated is in 8×8 blocks.

An encoder selects an intra prediction mode for luma and chroma blocks, within a macroblock, prior to encoding the macroblock and transmitting it on a network. Each of these selected intra prediction modes are sent to a client receiving the signal so that the video signal may be accurately reconstructed and displayed.

B. General Method of Prediction Mode Selection

Figure 1:
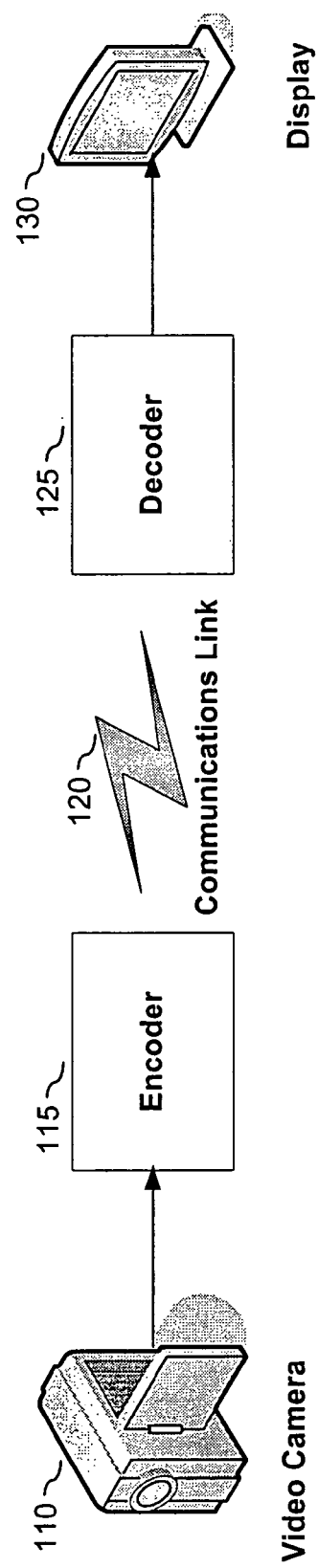
FIG. 1 is an illustration of a communication link on which data may be encoded and decoded.
Figure 2:
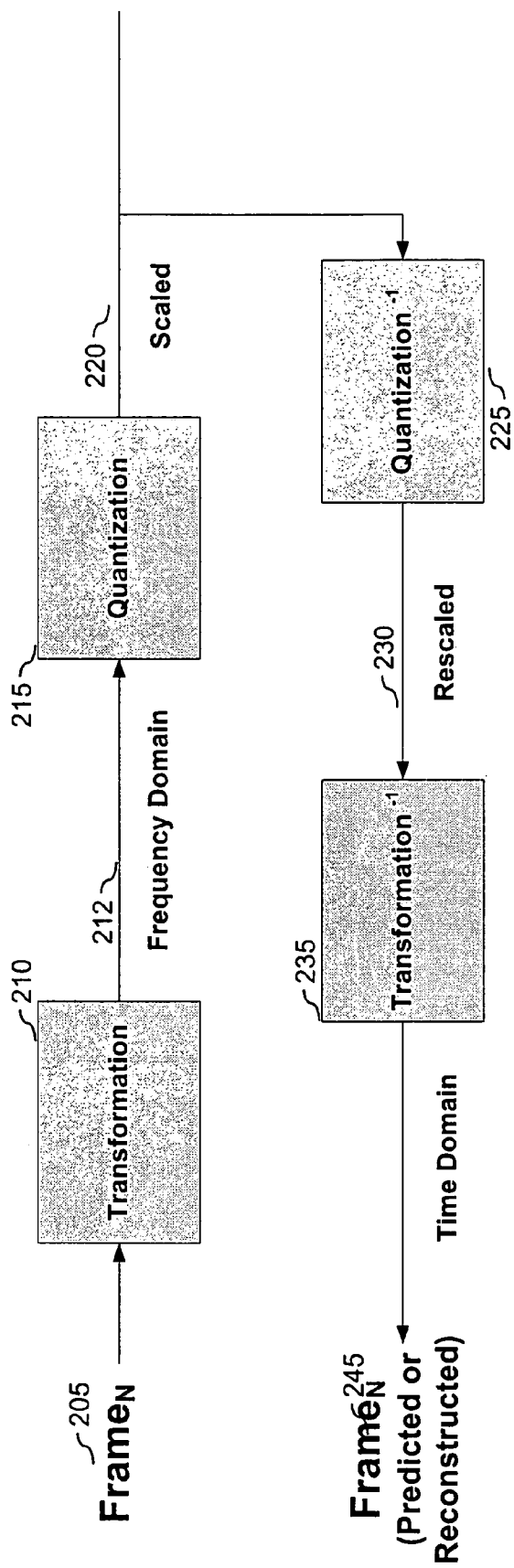
FIG. 2 is a general block diagram of an encoder.
Figure 4:
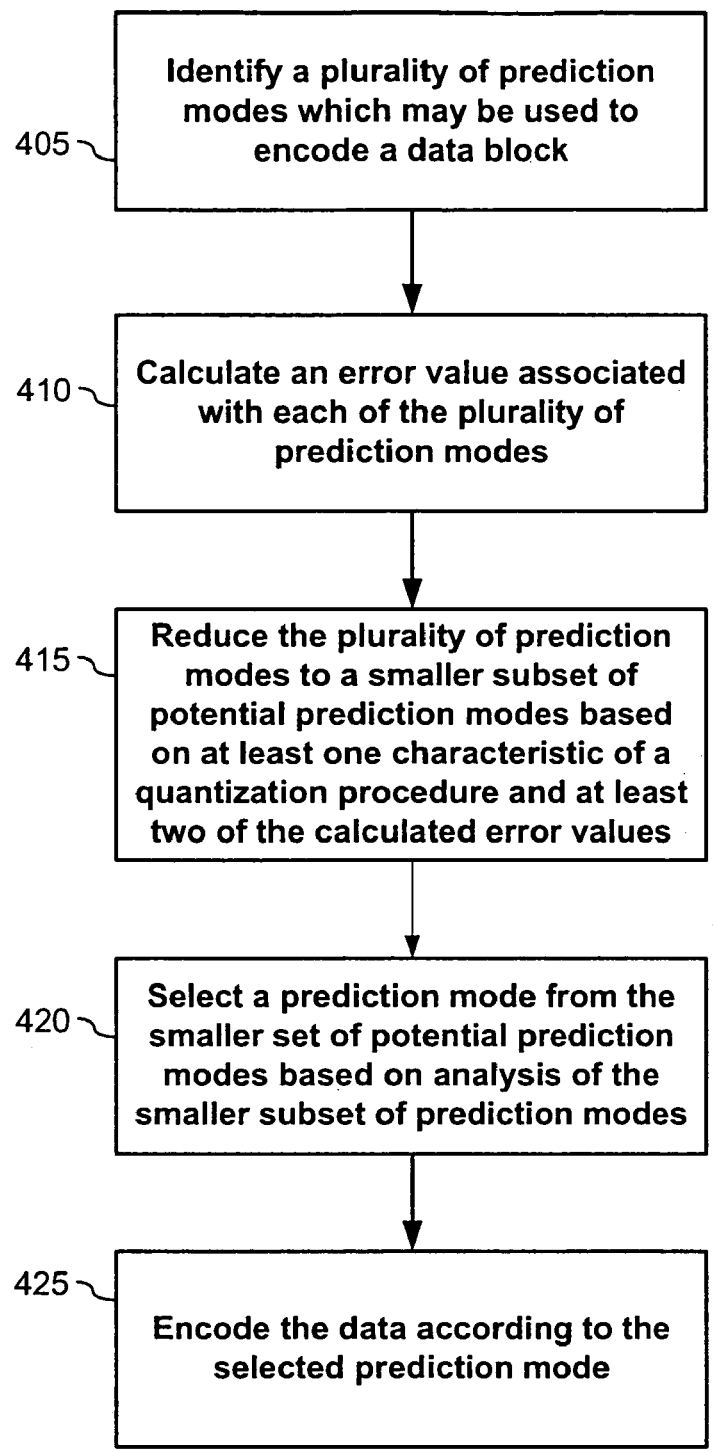
FIG. 4 is a flow chart describing a method for selecting a prediction mode for a block of data according to an embodiment of the present invention.

FIG. 4 illustrates a method for selecting a prediction mode for encoding a data block according to one embodiment of the present invention. A plurality of prediction modes are identified 405 that may be used to encode the data. This plurality of prediction modes may be defined by one or more standards or may be generated for the particular encoding process. A predicted block, estimating the amount of lost data introduced by the encoding and decoding process, may be generated for each prediction mode in the plurality of prediction modes.

An error value is calculated 410 for each of the generated predicted blocks. These error values may be used to filter the plurality of prediction modes into a smaller subset of prediction modes that may be subsequently analyzed. In one embodiment of the present invention, this error value may be generated by using a sum of absolute differences calculation that compares the original block to each predicted block generated from the plurality of prediction modes. In particular, this sum of absolute difference calculation identifies the quantity of errors between an original block of data and a predicted block of data. One skilled in the art will recognize that a number of different methods may be used to calculate an error value for each of these prediction modes.

The plurality of prediction modes may be reduced 415 to a smaller set of potential prediction modes based on the error values calculated for the prediction modes and at least one characteristic of the quantization procedure employed during the encoding process. one error value being calculated for each such prediction mode. In one embodiment of the invention, the plurality of prediction modes is reduced to a predefined quantity, a K value, of potential prediction modes. This K value may be defined based on a particular characteristic of the quantization process during an encoding procedure. For example, the K value may be defined based on the quantization parameter used to scale frequency coefficients generated from the transform process. The determination of a K value will be discussed in greater detail below.

The smaller set of potential prediction modes may be further analyzed 420 to determine a prediction mode that will be used to encode the particular block. In one embodiment, the prediction mode is selected based on which prediction mode has the smallest calculated error. In another embodiment, rate-distortion values are calculated for these prediction modes in the smaller subset, one rate-distortion value being calculated for each such prediction mode. The mode with the most optimal rate-distortion value is selected and the block is encoded accordingly. In either embodiment, analyzing the smaller subset of prediction modes as compared to the all the plurality of prediction modes, reduces the number of rate-distortion calculations performed by the encoder to select a prediction mode. One skilled in the art will recognize that a number of different methods may be used to select a prediction mode from the smaller set of prediction modes.

C. Prediction Mode Selection Under H.264 Standard

Figure 5:
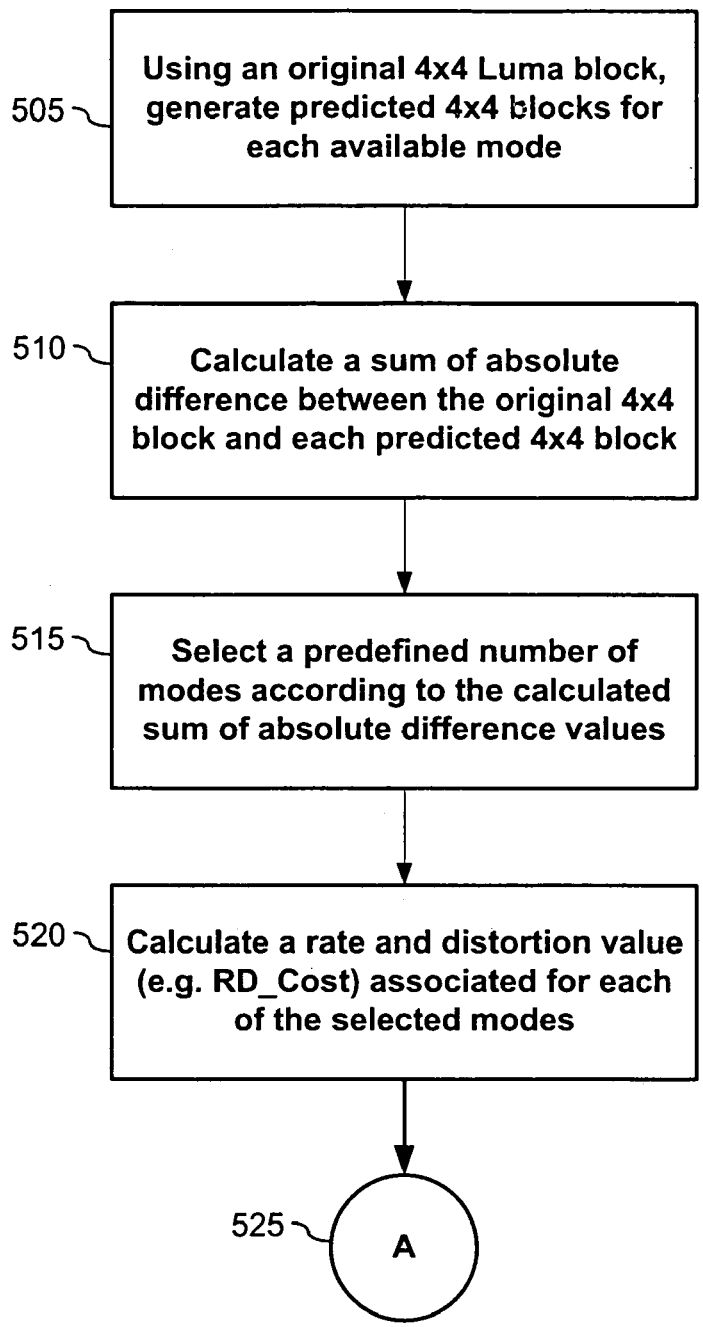
FIG. 5 is a flow chart describing a method for selecting a prediction mode for 4×4 luma blocks according to one embodiment of the invention.
Figure 7:
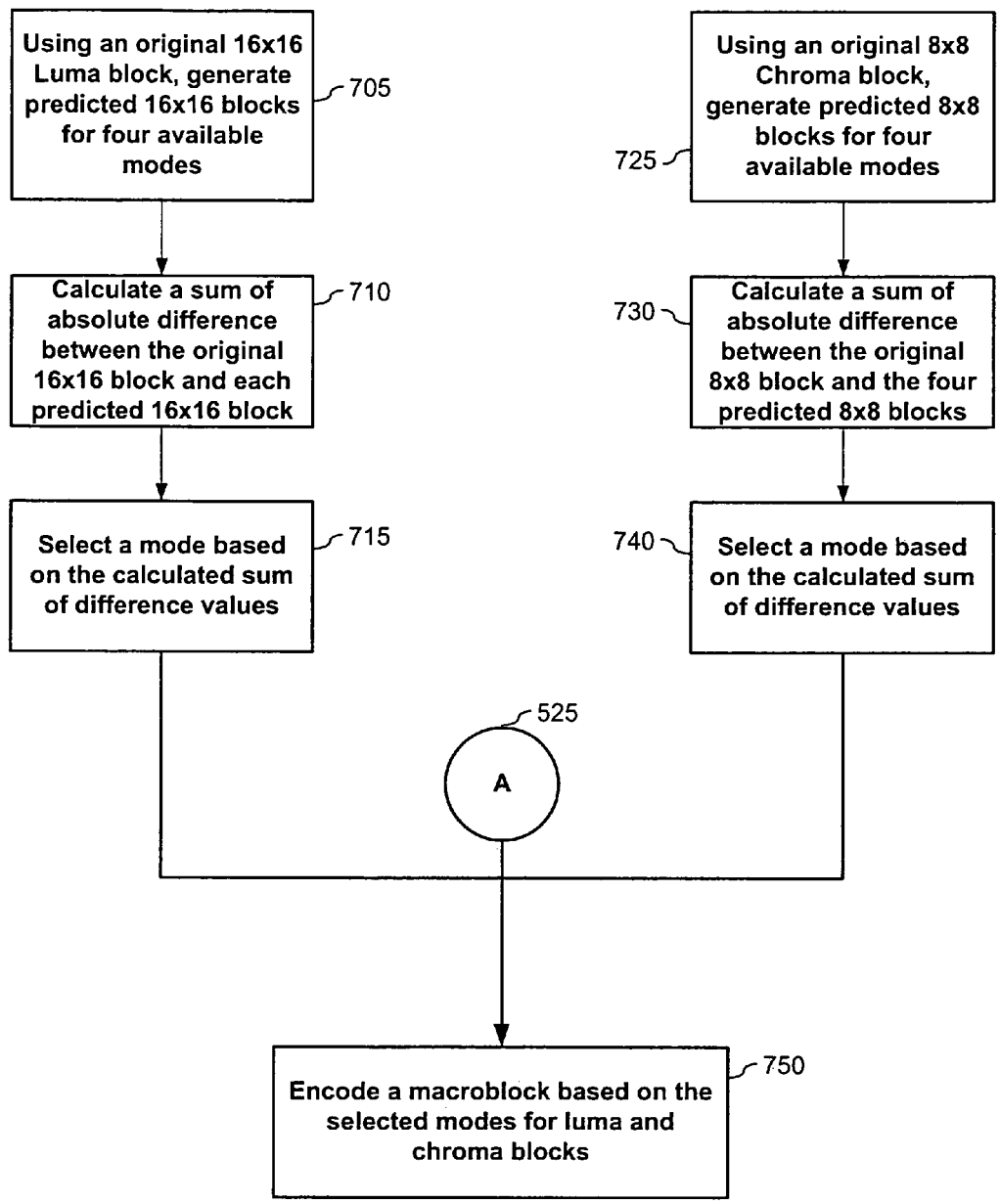
FIG. 7 is a flow chart a describing method for selecting a prediction mode for 8×8 chroma blocks and 16×16 luma blocks according to one embodiment of the present invention.

FIGS. 5 and 7 are flowcharts illustrating one embodiment of the invention that selects prediction modes for video frame encoding according to the H.264 standard. FIG. 6 is an exemplary K table that may be used in a prediction mode selection according to an embodiment of the invention.

a) 4×4 Luma Block Prediction Mode Selection

FIG. 5 illustrates a method for reducing the number of rate-distortion calculations that are performed in selecting a prediction mode for a 4×4 luma block according to one embodiment of the present invention. A predicted block is generated 505 from the 4×4 luma block for each of the nine potential prediction modes that are defined in the H.264 standard. This predicted block represents a data block that has gone through both encoding and decoding in a particular mode.

For each of the nine predicted blocks, an error value may be calculated that relates to the loss associated with the encoding and decoding process in the particular prediction mode. In this embodiment, the error value is calculated 510 by using a sum of absolute difference equation. This calculation compares the original 4×4 luma block to a predicted block and quantifies the error between the two blocks. These calculations result in nine error values associated with the nine prediction modes for the 4×4 luma block.

The nine potential prediction modes may be reduced so that a rate-distortion calculation is not computed for all nine modes. A prediction mode subset, having a predefined number of prediction modes less than nine, is selected 515 according to two factors. First, the prediction mode subset, or number of modes to which the nine modes are to be reduced, is determined based on the quantization parameter used during the encoding process. Thus, the size of the prediction mode subset may fluctuate relative to the magnitude of scaling done during the quantization phase of encoding. Second, the nine prediction modes are reduced by selecting those prediction modes that have the lowest calculated error value. Thus, if the smaller subset is defined to have five prediction modes therein, then the five prediction modes with the lowest error value are selected and subsequently analyzed to identify a single prediction mode.

The reduced number of prediction modes is analyzed to select a single prediction mode for encoding the 4×4 luma block. This analysis may be performed by calculating a rate-distortion value 520 for each of the remaining prediction modes in the smaller subset. After these rate-distortion values are calculated, the most optimal prediction mode is selected.

FIG. 6 illustrates an exemplary table that may be used to identify the predefined number of prediction modes to which the nine 4×4 luma prediction modes may be reduced. The first column 605 contains a quantization parameter value range, or scaling factor range, that is to be used to encode the 4×4 luma block. The second column 610 is a predefined number or K value, for an I-slice, that identifies the number of prediction modes in the smaller subset to which the nine 4×4 luma prediction modes may be reduced. The third column 615 contains a predefined number or K value, for a video P or B slice, which identifies the number of prediction modes in the smaller subset.

One skilled in the art will recognize that as the quantization parameter value increases, the amount of data loss during the encoding process increases. Thus, in an attempt to compensate for this relative increase in lost data, the K value increases, which raises the amount of prediction modes for which a rate-distortion calculation is performed.

FIG. 7 illustrates a method for selecting at least one prediction mode for an 8×8 chroma block and/or a 16×16 luma block according to one embodiment of the present invention.

b) 16×16 Luma Block Prediction Mode Selection

A predicted block is generated 705 from a 1 6×16 luma block for each of four potential prediction modes that are defined in the H.264 standard. As was the case with the 4×4 luma block, this predicted block represents a data block that has gone through both encoding and decoding in a particular mode.

For each of the four predicted blocks, an error value may be calculated 710 using the sum of absolute difference formula that relates to the loss associated with the encoding and decoding process in a particular prediction mode. The sum of absolute difference calculation is one of may different calculations that measure an error between the original luma block and the predicted blocks, all of which are intended to fall under the scope of this embodiment. This calculation results in four error values, each associated with a particular prediction mode.

A prediction mode may be selected 715 based on the error calculation for each of the four prediction modes. This prediction mode selection may occur without using any rate-distortion calculations, which typically are more burdensome on processing resources and require more time.

c) 8×8 Chroma Block Prediction Mode Selection

A predicted block is generated 725 from the 8×8 chroma block for each of four potential prediction modes that are defined in the H.264 standard. As was the case with the 4×4 and 16×16 luma blocks, this predicted block represents a data block that has gone through both encoding and decoding in a particular mode.

For each of the four predicted blocks, an error value may be calculated 730 using the sum of absolute difference calculation that relates to the loss associated with the encoding and decoding process in a particular prediction mode. As was the case with the 16×16 luma block, many different calculations may be used to estimate the error in the predicted blocks. This calculation results in four error values, each associated with a particular prediction mode for the chroma block.

Similar to the 16×16 luma block prediction mode selection, a prediction mode for the 8×8 chroma block may be selected 740 based on which prediction mode has the lowest calculated error value. This prediction mode selection may occur without using any rate-distortion calculations, which as mentioned above, are typically more burdensome on processing resources and require more time.

d) Reduction in Computations for Prediction Mode Selection

After prediction modes for the video macroblock luma and chroma components are identified, the video macroblock is encoded 750 according to these selected prediction modes. The above-described embodiments of the invention lessen the processing and time requirements on an encoder by reducing the number of rate-distortion value computations performed during the prediction mode selection phase of encoding. The number of rate-distortion value computations may be identified in the following equation:

Total number of rate-distortion calculations=$N8\times(N4\times 16+N16)$, where

N8 is the number of computed modes for a 8×8 chroma block;
N4 is the number of computed modes for a 4×4 luma block; and
N16 is the number of computed modes for a 16×16 luma block.

For an H.264 macroblock, the total number of rate-distortion computations is 592 without any filtering or reduction in the prediction modes that are included in this calculation. However, according to the above-described embodiments of the invention, the total number of computations may be reduced a total number of 16K+1, where the K value is the predefined number of prediction modes in the smaller subset relating to the 4×4 luma block for which rate-distortion values are calculated. This reduction in rate-distortion computations results from selecting the prediction mode for a 16×16 luma block and a 8×8 chroma block without rate-distortion computations, and reducing the number of rate-distortion computations for a 4×4 luma block to K. Thus if K is equal to 3, then the number of rate-distortion computations would be a total of 49 computations. If K is equal to 5, then the number of rate-distortion computations would be a total of 81 computations.

The resulting reduction in the total number of rate-distortion computations may significantly reduce the resource and time requirements placed on the encoder. Additionally, because the amount of reduced rate-distortion computations depends on the scaling factor employed during quantization, the embodiment of the invention is adaptive to the characteristics of the encoding that will be performed. Thus, if a large quantization parameter is used that introduces a relatively larger amount of loss, then the amount of rate-distortion computations increases to try and compensate for this loss. However, if a smaller quantization parameter is used that introduces a relatively smaller amount of loss, then the amount of rate-distortion computations decreases.

D. Structural Representation of 4×4 Luma Block Prediction Mode Selection

Figure 8:
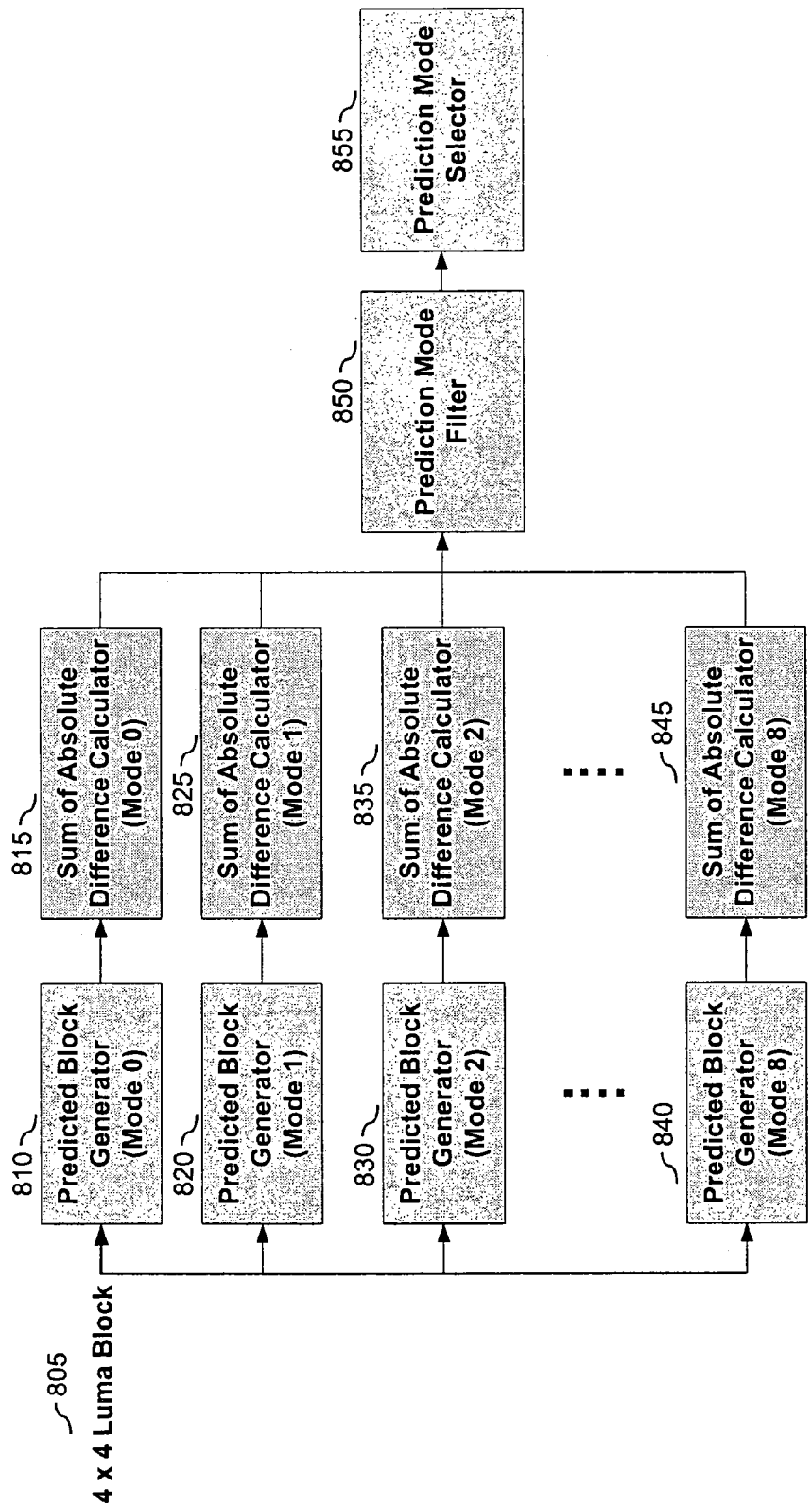
FIG. 8 is a block diagram of a prediction mode selection device for a 4×4 luma block according to one embodiment of the present invention.

FIG. 8 illustrates a 4×4 luma block prediction mode selector that selects a mode in which a 4×4 luma block is to be encoded according to one embodiment of the present invention. As illustrated in this Figure, an array of predicted block generators 810, 820, 830, 840 generate a predicted block of a 4×4 luma block 805 for each of the nine possible modes (modes 0 through 8). According to one embodiment, there may be a single predicted block generator for each of the nine prediction modes. In yet another embodiment, this array of predicted block generators 810, 820, 830, 840 may be integrated into a single module or combined into multiple modules. Each of the nine predicted blocks may be generated by transforming and quantizing the 4×4 luma block 805 according to a particular prediction mode. After this transformation and quantization, the block is reconstructed by inversely quantizing and inversely transforming the block according to the same particular prediction mode. This reconstructed block represents the predicted block, having some associated error, of the 4×4 luma block 805 that was encoded in the particular prediction mode.

An array of error calculation modules 815, 825, 835, 845 receives the nine predicted blocks generated for the 4×luma block 805 according to the nine prediction modes. These error calculation modules may be integrated into a single module or multiple modules. According to one embodiment of the invention, a sum of absolute difference calculation is used to identify the error between a predicted block and the luma block 805. Accordingly, nine sum of absolute difference calculations are done corresponding to the nine different predicted blocks generated for each of the nine prediction modes. One skilled in the art will recognize that other calculations may be performed in order to quantify an error value related to a predicted block that was generated in a particular prediction mode.

A prediction mode filter 850 reduces the number of modes in which rate-distortion values are computed. According to one embodiment of the invention, the prediction mode filter 850 may use a K Table, an example is described above. This K table identifies a predefined number, less than or equal to nine, of prediction modes within a smaller subset to which the nine prediction modes may be reduced. The K table may be based on a quantization parameter that is used during the quantization of frequency coefficients during the encoding process.

Once a predefined number is identified, certain prediction modes are excluded based on their error value; thereby reducing the number of prediction modes for which a rate-distortion calculation is performed. According to one embodiment of the present invention, prediction modes are excluded in order of highest calculated error value. Thus, if a K value of 5 is identified, then the four prediction modes with the largest error values would be excluded.

A prediction mode is selected from the filtered prediction modes by a prediction mode selector 855. According to one embodiment of the invention, the prediction mode selector 855 calculates a rate-distortion value for each of the remaining filtered prediction modes. Thereafter, the prediction mode selector 855 selects the best prediction mode for the filtered prediction modes. One skilled in the art will recognize that other methods may be used to select a single prediction mode from the filtered set of prediction modes.

Figure 9:
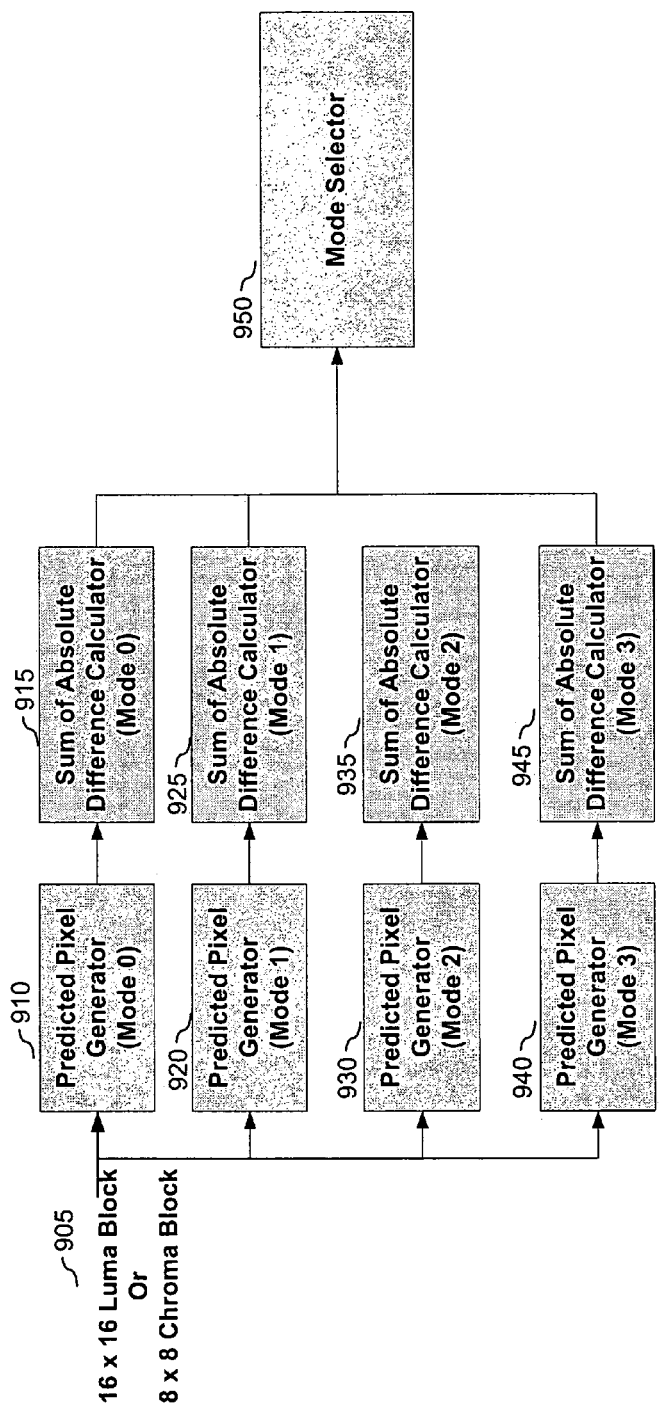
FIG. 9 is a block diagram of a prediction mode selection device for a 16×16 luma block or an 8×8 chroma block according to one embodiment of the present invention.

E. Structural Representation of a 16×16 Luma/8×8 Chroma Block Prediction Mode Selector FIG. 9 illustrates a 16×16 luma/8×8 chroma block prediction mode selector that selects a mode in which a corresponding block is to be encoded according to one embodiment of the present invention. As described above, the H.264 standard defines four possible prediction modes for these two types of blocks. For purposes of this embodiment, the selection of a prediction mode for both types of blocks may be identified in a similar manner.

As illustrated in this Figure, an array of predicted block generators 910, 920, 930, 940 generate a predicted block of a 16×16 luma block or 8×8 chroma block 905 for each of the four possible modes (modes 0 through 3). According to one embodiment, there may be a single predicted block generator associated with each of the four prediction modes (as shown in this Figure). In yet another embodiment, this array of predicted block generators 910, 920, 930, 940 may be integrated into a single module or combined into multiple modules. Each of the four predicted blocks may be generated by transforming and quantizing the 16×16 luma block or 8×8 chroma block 905 according to a particular prediction mode. After this transformation and quantization, the block is reconstructed by inversely quantizing and inversely transforming the block according to the same particular prediction mode. This reconstructed block represents the predicted block, having some error, for the 16×16 luma block or 8×8 chroma block 905 that was encoded in the particular prediction mode.

An array of error calculation modules 915, 925, 935, 945 receives the four predicted blocks generated for the 16×16 luma block or 8×8 chroma block 905 according to the four prediction modes, respectively. These error calculation modules may be integrated into a single module or multiple modules. According to one embodiment of the invention, a sum of absolute difference calculation is used to identify the error between a predicted block and the luma or chroma block 905. Four different sum of absolute difference calculations are done corresponding to the four different predicted blocks generated for each of the four prediction modes. One skilled in the art will recognize that other calculations may be performed in order to quantify an error value related to a predicted block that was generated in a particular prediction mode.

A prediction mode selector 950 selects a prediction from the four different prediction modes for a particular 16×16 luma block or 8×8 chroma block. According to one embodiment of the invention, the prediction mode selector 950 selects the mode based on the error calculations that were previously done. Thus, the prediction mode with the lowest amount of lost data, based on the previous error calculations, would be selected. In yet another embodiment, the prediction mode selector 950 calculates a rate-distortion value for at least one of the four available prediction modes for the 16×16 luma block or 8×8 chroma block. A prediction mode may then be selected based on an analysis of the rate-distortion computations. One skilled in the art will recognize that a number of different methods may be employed to select a prediction mode from the set of available four prediction modes corresponding to a 1 6×16 luma or 8×8 chroma block.

Once prediction modes have been selected for 4×4 luma blocks, 8×8 chroma blocks, and 16×16 luma blocks, then a macroblock may be encoded and transmitted onto a communications link. These modes are provided to a client receiving the macroblock so that it may be decoded and displayed.

The above description is included to illustrate the operation of the preferred embodiments and is not meant to limit the scope of the invention. From the above description, many variations will be apparent to one skilled in the art that would yet be encompassed in the spirit and scope of the invention. Accordingly, the scope of the invention is to be limited only by the following claims.

We claim:

1. A method of selecting a prediction mode for intra-coding a macroblock using a coding component, the method comprising:

identifying a first plurality of prediction modes for intra-coding a macroblock;

identifying a second plurality of prediction modes from among the prediction modes in said first plurality of prediction modes, the number of prediction modes in said second plurality of prediction modes being dependent upon at least one quantization parameter in an intra-coding process; and selecting a prediction mode from the prediction modes in said second plurality of prediction modes for intra-coding a macroblock.

2. The method of claim 1, wherein the first plurality of prediction modes is identified based on a standard.

3. The method of claim 2, wherein the standard is H.264 video encoding standard.

4. A method of selecting a prediction mode from a first plurality of prediction modes for a macroblock of video data using a coding component, the method comprising:

using each prediction mode in said first plurality of prediction modes to generate a respective predicted luma block from a luma block partitioned from the macroblock;

identifying a luma error value for each predicted luma block and the luma block;

creating a second plurality of prediction modes by selecting a number of prediction modes from said first plurality of prediction modes based on the luma error values, wherein said number of prediction modes is proportional to a quantization parameter; and selecting a final prediction mode from the second plurality of prediction modes for the luma block.

5. The method of claim 4, wherein said luma error values are identified via a sum of absolute difference calculation of the luma block and a corresponding predicted luma block.

6. The method of claim 4, wherein the final prediction mode is selected according to a rate-distortion calculation applied to each prediction mode within said second plurality of prediction modes.

7. The method of claim 4, wherein the luma block is a 4×4 luma block as defined by the H.264 standard.

8. The method of claim 4 further comprising the steps of:
generating at least one predicted chroma block from a chroma block partitioned from the macroblock;
identifying a chroma error value based on the at least one predicted chroma block and the chroma block; and
selecting a second prediction mode for the chroma block.

9. The method of claim 8, wherein the chroma error value is identified via a sum of absolute difference calculation of the chroma block and the at least one predicted chroma block.

10. The method of claim 8, wherein the second prediction mode is selected based on the identified chroma error value.

11. A computer readable medium containing a program for enabling the selection of a prediction mode, the program comprising instructions for:
identifying a first plurality of prediction modes for intra-coding a macroblock;
identifying a second plurality of prediction modes by reducing the initial number of prediction modes within said first plurality of prediction modes to a second number of prediction modes, prediction modes for inclusion in said second plurality of prediction modes being selected based on a first error calculation, said second number being based on at least one quantization parameter in an intra-coding process; and
selecting a final prediction mode from the second plurality of prediction modes for intra-coding a macroblock based on a second error calculation different from said first error calculation.

12. The computer readable medium of claim 11, wherein said first error calculation is less computationally intensive than said second error calculation.

13. An encoder for encoding data in multiple prediction modes, comprising:
a predicted block generator that produces a data block having been encoded and decoded in a particular prediction mode;
an error value module that estimates the error value within at least one predicted block;
a prediction mode filter that reduces the number of available prediction modes to a second smaller number of prediction modes, selection of prediction modes for inclusion in said second smaller number being based on at least one error value from the error value module, and said second smaller number being proportional to at least one quantization parameter; and
a prediction mode selector that selects a final prediction mode from the second smaller number of prediction modes.

14. The encoder of claim 13, wherein the error value is estimated using a sum of absolute differences calculation, and said prediction mode selector uses a second error value to select said final prediction mode, determination of said second error value requiring greater computational resources than determination of said first error value.

15. The method of claim 1, wherein the number of prediction modes in said second plurality of prediction modes is directly proportional to said quantization parameter.

16. The method of claim 1, wherein the number of prediction modes in said second plurality of prediction modes is smaller than the number of prediction modes in said first plurality of prediction modes.

17. The method of claim 1, wherein said macroblock is subjected to a transform function creating a series of coefficients, and said quantization parameter quantizes said coefficients.

18. The method of claim 1, wherein;
each prediction mode within said first plurality of prediction modes is subjected to a first error calculation to determine an individual error value for each prediction mode within said first plurality of prediction modes;
the prediction modes within said second plurality of prediction modes are selected from among the prediction modes in said first plurality of prediction modes having the lowest error values.

19. The method of claim 18, wherein;
each prediction mode within said second plurality of prediction modes is subjected to a second error calculation to determine an individual error value for each prediction mode within said second plurality of prediction modes, said first error calculation being less computationally intensive than said second error calculation.

20. The method of claim 19, wherein a predicted block is generated using each prediction mode within said plurality of prediction modes;
said first error calculation is a sum of absolute differences calculation that compares said macroblock to each predicted block generated using the first plurality of prediction modes; and
said second error calculation is a rate-distortion calculation.

21. The method of claim 20, wherein said rate-distortion calculation is defined as:

$$J(s,c,m|QP, \lambda_m) = SSD(s,c,m|QP) + \lambda_m * R(s,c,m|QP),$$

where QP is the macroblock quantization parameter, $\lambda_m$ is a Lagrange multiplier for mode decisions, SSD is a sum of squared differences between the macroblock and a reconstructed block, and R is the number of bits associated with a prediction mode.

22. The method of claim 1, wherein;
each prediction mode within said first plurality of prediction modes is subjected to a first error calculation to determine an individual error value for each prediction mode within said first plurality of prediction modes;
each prediction mode within said second plurality of prediction modes is subjected to a second error calculation to determine an individual error value for each prediction mode within said second plurality of prediction modes, said second error calculation being different than said first error calculation, and said first error calculation being less computationally intensive than said second error calculation.

* * * * *